United States Patent [19]
de Ahna et al.

[11] 3,899,347
[45] Aug. 12, 1975

[54] PRASEODYMIUM CONTAINING CERAMIC PIGMENTS

[75] Inventors: Heinz-Dieter de Ahna, Neuisenberg; Rüdiger von der Gonna, Erlensee, both of Germany

[73] Assignee: Deutsche Gold- und Silber-Scheideanstalt vormals Roessler, Germany

[22] Filed: July 17, 1974

[21] Appl. No.: 489,435

[30] Foreign Application Priority Data
July 27, 1973  Germany............................ 2338154

[52] U.S. Cl.................................. 106/299; 106/303
[51] Int. Cl.² ........................................ C09C 1/00
[58] Field of Search................. 106/299, 303, 288 B

[56] References Cited
UNITED STATES PATENTS
3,058,838  10/1962  Olby .................................. 106/299
3,510,332   5/1970  Weber ............................... 106/299

Primary Examiner—Patrick P. Garvin
Assistant Examiner—J. V. Howard
Attorney, Agent, or Firm—Cushman, Darby & Cushman

[57] ABSTRACT

Zirconium dioxide - silicon dioxide - praseodymium oxide ceramic pigments have added thereto 0.01 to 10% of an oxide of antimony, niobium, bismuth and/or tantalum.

8 Claims, No Drawings

PRASEODYMIUM CONTAINING CERAMIC PIGMENTS

The present invention is directed to praseodymium containing ceramic pigments which additionally contain 0.01 to 10% of an oxide of the metals antimony, bismuth, niobium and/or tantalum and to an especially advantageous process for making these pigments using a molybdenum oxide-sodium chloride mixture as a mineralizer.

Typical examples of suitable oxides include antimony trioxide, antimony pentoxide, antimony tetroxide, bismuth trioxide, bismuth pentoxide, niobium trioxide, niobium pentoxide, tantalum pentoxide and tantalum tetroxide. The heat stable oxides, e.g., antimony trioxide, bismuth trioxide, niobium trioxide, niobium pentoxide and tantalum pentoxide are preferred.

Yellow ceramic pigments of the system zirconium dioxide-silicon dioxide-praseodymium oxide are used in considerable amounts to color glazes because of their purity of color and resistance to firing. These simple praseodymium containing zirconium silicate pigments, however, have the disadvantage that their yellow color has little color intensity.

There have been numerous attempts to increase the color intensity of these yellow pigments by building in further oxidic additions as for example oxides of the rare earths, tungsten oxide, alkaline earth oxides, lead oxide or copper oxide (Japanese Pat. No. 5,239, Seabright U.S. Pat. No. 2,992,123, German Auslegeschrifts 1,222,840 and 1,222,841 and German Offenlegungsschrifts 1,571,484). To be sure these pigments can increase the color intensity. For many purposes, however, still more intense pigments are desired, which especially also should exhibit additional color shades.

It was therefore the problem of the present invention to develop praseodymium containing ceramic pigments which possess an intensive color tone and additional color shades.

This problem was solved according to the invention by adding to the system zirconium dioxide-silicon dioxide-praseodymium oxide 0.01 to 10% of an oxide of the metals antimony, bismuth, niobium and/or tantalum. Preferably the pigments contain 0.1 to 1% of the named metal oxides. The addition of antimony oxide, i.e., antimony trioxide, has proven especially good.

The praseodymium oxide employed can be for example $Pr_6O_{11}$ or other praseodymium compounds, which form $Pr_6O_{11}$ in the annealing operation.

The pigments of the invention have a greenish-yellow color tone and have a higher color strength than the previously known praseodymium pigments while also having good chemical and thermal stability.

In the working examples the starting praseodymium oxide was $Pr_6O_{11}$.

The production of pigments according to the invention takes place by mixing finally divided starting compounds which are present in the form of oxides or which can be converted into oxides at higher temperatures and subsequent annealing at 850°C to 1,250°C. The preferred annealing range is at 1,000° to 1,100°C. Advantageously there are added mineralizers in the form of sodium fluoride and/or sodium chloride. As starting compounds above all there may be mentioned the pure oxides of zirconium, silicon and praseodymium and of the metals antimony, bismuth, niobium and/or tantalum.

The oxides $ZrO_2$ and $SiO_2$ are added in the molar ratio of 1:1 or in the range from 0.8 to 1.2 moles. There is added thereto 0.5 to 10% of praseodymium oxide and 0.01 to 10% of an oxide of the metals antimony, bismuth, niobium and/or tantalum based on the total weight of the $ZrO_2$ and $SiO_2$.

Especially intensely colored praseodymium yellow pigments are obtained if the calcining of the oxide constituents is carried out in the presence of a mineralizer system which contains 1 to 10% of an oxide or an oxide forming compound of the metals molybdenum and/or tungsten, e.g., molybdenum trioxide, molybdenum sesquoxide, molybdenum dioxide, tungsten dioxide, tungsten trioxide, or tungsten pentoxide. Above all there has been proven to be a good mineralizer system which contains 1 to 10% molybdenum trioxide and 10 to 30% of sodium chloride based on the total amount of starting material. In this way there is obtained as especially color intensive greenish tinged praseodymium yellow pigment.

As mineralizer, there can be used in addition to those mentioned above other conventional mineralizers such as other alkali metal compounds, alkaline earth fluorides, e.g., barium fluoride, calcium fluoride or magnesium fluoride, or lead compounds, e.g., lead fluoride, lead nitrate, PbO or $Pb_3O_4$.

Unless otherwise indicated all parts and percentages are by weight.

The following example further explains the invention.

36 grams of zirconium dioxide, 29 grams of silicon dioxide, 3 grams of praseodymium oxide ($Pr_6O_{11}$) and 1 gram of antimony trioxide were mixed and finely ground. After the addition of a mixture of 26 grams of sodium chloride and 5 grams of molybdenum trioxide the mixture was annealed for 3 hours at 1,050°C. The annealed product was ground, washed free of salt with water and then dried. There was obtained thereby a very intensely colored greenish yellow pigment.

Similar pigments are obtained if in place of antimony trioxide there are used the corresponding oxides of bismuth, niobium and/or tantalum, e.g., bismuth trioxide, niobium trioxide, tantalum tetroxide or tantalum pentoxide. By variation of the added molybdenum constituent the color tone can be changed within fixed limits at a constant color intensity.

While it is preferred to add the mineralizers, they can be omitted if desired.

We claim:

1. A zirconium dioxide-silicon dioxide-praseodymium oxide ceramic pigment containing 0.01 to 10% of an oxide of a metal of the group consisting of antimony, bismuth, niobium and tantalum.

2. A pigment according to claim 1 wherein the praseodymium oxide is present in an amount of 0.5 to 10%.

3. A pigment according to claim 2 wherein the zirconium dioxide and silicon dioxide are present in equimolar amounts, or in the range from 0.8 to 1.2 moles.

4. A process for the production of the praseodymium containing ceramic pigment of claim 1 comprising calcining a mixture containing zirconium, silicon, praseodymium and an alkali metal compound and 0.01 to 10% of a member of the group consisting of oxides and oxide forming compounds of antimony, bismuth, niobium and tantalum in the presence of 1 to 10% of an oxide or oxide forming compound of molybdenum or tungsten.

5. A process according to claim 4 wherein the calcining is at a temperature of 850° to 1,250°C.

6. A process according to claim 5 carried out in the presence of molybdenum trioxide.

7. A process according to claim 6 carried out in the presence of sodium chloride and/or sodium fluoride.

8. A process according to claim 4 wherein the alkali metal compound is sodium chloride or sodium fluoride.

* * * * *

UNITED STATES PATENT OFFICE
CERTIFICATE OF CORRECTION

Patent No. 3,899,347    Dated August 12, 1975

Inventor(s) Heinz-Dieter deAhna and Rudiger von der Gonna

It is certified that error appears in the above-identified patent and that said Letters Patent are hereby corrected as shown below:

Column 2, Claim 3, line 3 of the claim delete:

", or in the range from 0.8 to 1.2 moles"

Column 4, add the following claim:

9. A pigment according to Claim 2 wherein the zirconium dioxide and silicon dioxide are present in the range from 0.8 to 1.2 moles.

Signed and Sealed this second Day of March 1976

[SEAL]

Attest:

RUTH C. MASON
*Attesting Officer*

C. MARSHALL DANN
*Commissioner of Patents and Trademarks*